United States Patent
Kanaya

(10) Patent No.: US 9,300,827 B2
(45) Date of Patent: Mar. 29, 2016

(54) IMAGE-READING APPARATUS

(71) Applicant: PFU Limited, Ishikawa (JP)

(72) Inventor: Shingo Kanaya, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/459,078

(22) Filed: Aug. 13, 2014

(65) Prior Publication Data

US 2015/0319322 A1  Nov. 5, 2015

(30) Foreign Application Priority Data

Apr. 30, 2014 (JP) .................................. 2014-094072

(51) Int. Cl.
*H04N 1/04* (2006.01)
*H04N 1/00* (2006.01)

(52) U.S. Cl.
CPC .................................. *H04N 1/00588* (2013.01)

(58) Field of Classification Search
CPC ................................................ H04N 1/00588
USPC .................................. 358/498, 497, 496, 474
See application file for complete search history.

(56) References Cited

U.S. PATENT DOCUMENTS

2013/0111198 A1*  5/2013  Tsutsui ..................... G06F 9/00
713/1

FOREIGN PATENT DOCUMENTS

| JP | 05-170356 A | 7/1993 |
|---|---|---|
| JP | 06-019247 A | 1/1994 |
| JP | 2003-015780 A | 1/2003 |
| JP | 2008-078824 A | 4/2008 |
| JP | 2009-049619 A | 3/2009 |
| JP | 2009-132053 A | 6/2009 |
| JP | 2010-068104 A | 3/2010 |
| JP | 2011-228963 A | 11/2011 |
| JP | 2011-244352 A | 12/2011 |
| JP | 2013-092990 A | 5/2013 |

OTHER PUBLICATIONS

Notice of Rejection Japanese Patent Application No. 2014-094072 dated Feb. 17, 2015 with full English translation.
Decision of a Patent Grant Japanese Patent Application No. 2014-094072 dated May 26, 2015 with English translation.

* cited by examiner

*Primary Examiner* — Houshang Safaipour
(74) *Attorney, Agent, or Firm* — McDermott Will & Emery LLP

(57) ABSTRACT

An image-reading apparatus includes a battery that is built-in in a housing, a conveying unit conveying a medium, an image capturing unit capturing an image of the medium, a control unit controlling at least the conveying unit and the image capturing unit, a setting-table-opened/closed sensor as a state detector detecting whether the image capturing unit is ready to read the medium, a reset unit resetting the control unit, a scanning button and a Wi-Fi protected setup (WPS) button, each of which is an operation unit disposed on an outer peripheral surface of the housing and used for giving an instruction to the control unit. The reset unit resets the control unit upon satisfaction of a first condition that the setting-table-opened/closed sensor determines that the image capturing unit is unready to read the medium and a second condition that the operation unit is operated.

3 Claims, 4 Drawing Sheets

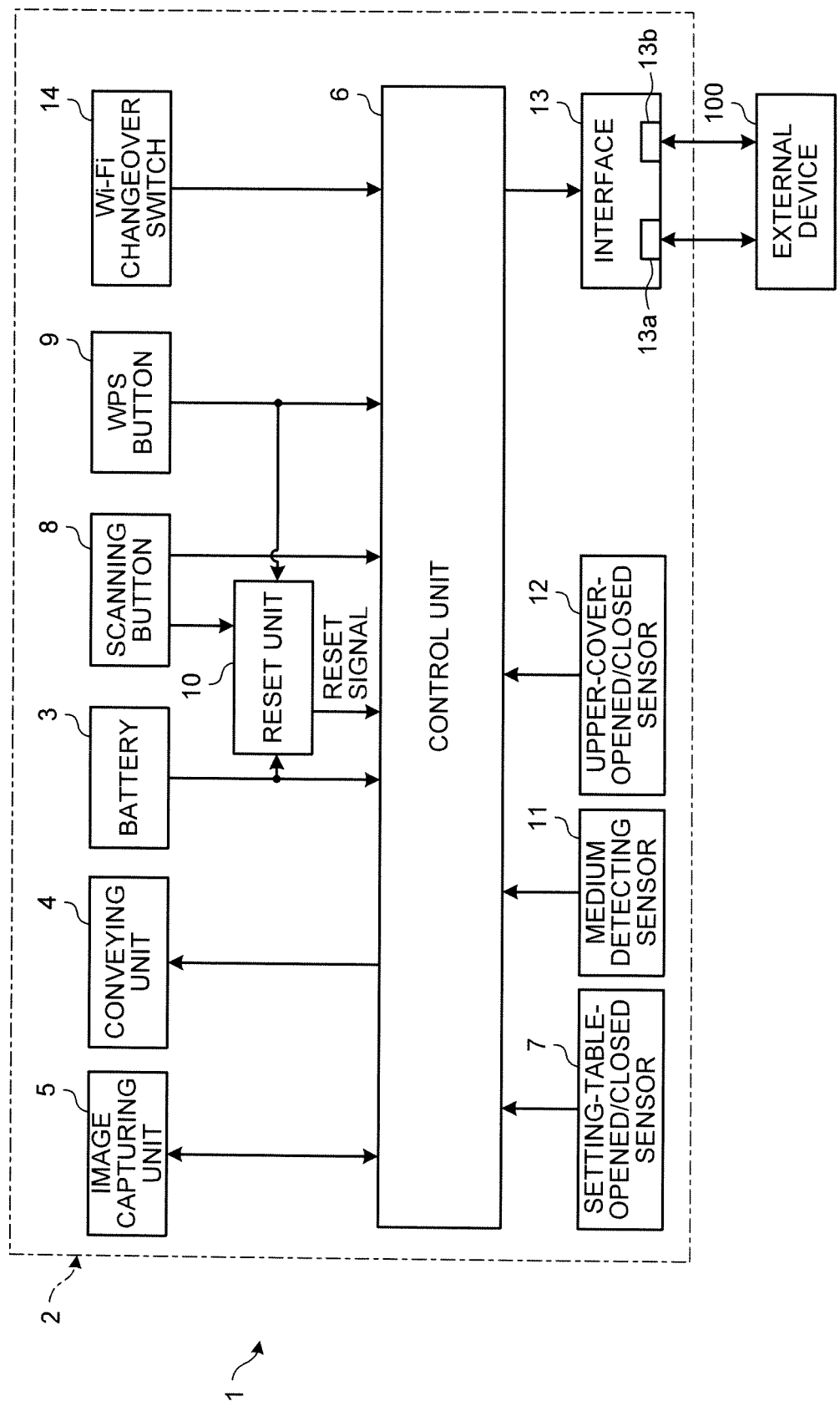

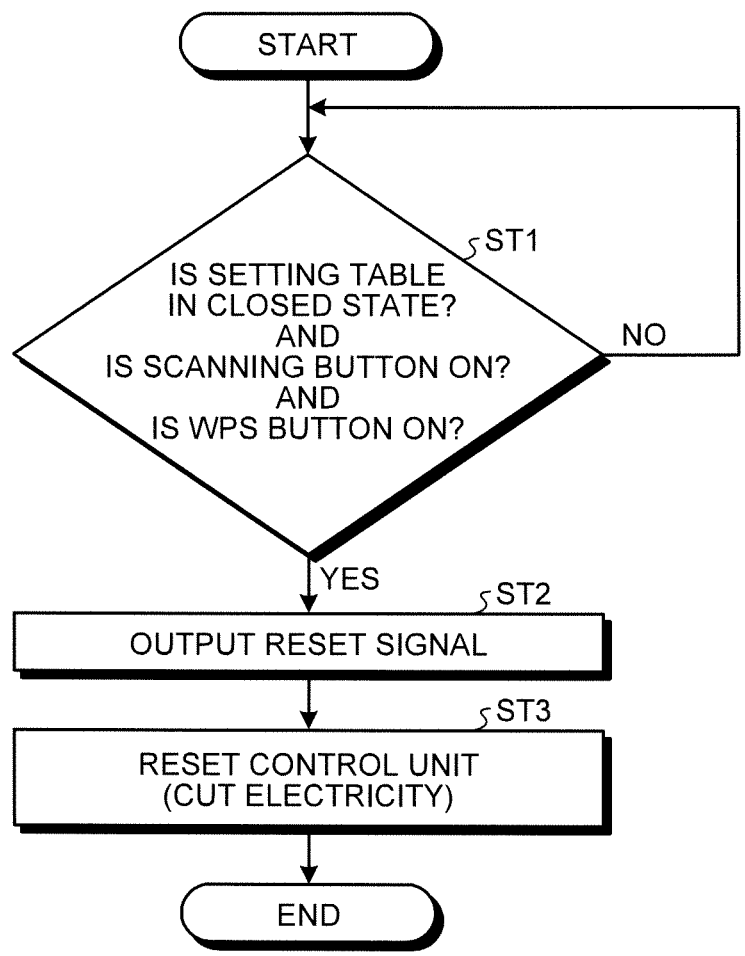

IMAGE-READING APPARATUS

CROSS-REFERENCE TO RELATED APPLICATION(S)

The present application claims priority to and incorporates by reference the entire contents of Japanese Patent Application No. 2014-094072 filed in Japan on Apr. 30, 2014.

BACKGROUND OF THE INVENTION

1. Field of the Invention

The present invention relates to an image-reading apparatus.

2. Description of the Related Art

Examples of image-reading apparatuses include a manually-fed image-reading apparatus including an image-capturing unit and a conveying unit to convey a medium such as paper to the image-capturing unit, where a user feeds the medium to the conveying unit thereof, guiding the medium with the user's hands. Conventionally, for the sake of portability, such a manually-fed image-reading apparatus operates to read a medium using only an external power source such as a personal computer.

When a control unit of an electronic device hangs up or freezes, i.e., becomes stuck so as to be immovable and does not respond to any input, a user cannot turn the electronic device off even by operating an operation unit for turning the electronic device off. Consequently, the user needs to reset the control unit of the electronic device in another way (see Japanese Patent Application Laid-open No. 2003-92990). When a control unit controlling a conventional manually-fed image-reading apparatus hangs up or freezes, the manually-fed image-reading apparatus is reset by removing a power source cable connecting an external power source and the manually-fed image-reading apparatus and forcibly cutting the electricity supply from the external power source.

There are needs to read a medium to be read even under circumstances where no external power source is available. Mounting a secondary battery on a manually-fed image-reading apparatus is thought to be a solution for such needs. In the manually-fed image-reading apparatus on which the secondary battery is mounted, the secondary battery is charged by electricity supplied from the external power source, and under circumstances without electricity supply from the external power source, the manually-fed image-reading apparatus operates with electricity supplied from the secondary battery itself. When a control unit of the manually-fed image-reading apparatus hangs up or freezes, the control unit is reset by removing the secondary battery from the manually-fed image-reading apparatus and forcibly cutting the electricity supply from the external power source. However, when assuming a case where the secondary battery cannot be removed from the manually-fed image-reading apparatus, it is preferable that the control unit of the manually-fed image-reading apparatus be reset by an operation thereof made by the user. However, if the control unit is reset in a simple way, such a problem may occur that the control unit is reset during use of the manually-fed image-reading apparatus, which results in loss of data being read.

SUMMARY OF THE INVENTION

It is an object of the present invention to at least partially solve the problems in the conventional technology.

According to an aspect of the invention, an image-reading apparatus comprises a housing having an insertion slot for inserting therein a medium, a battery being built-in in the housing, a conveying unit conveying the medium from the insertion slot to inside of the housing, an image capturing unit capturing an image of the medium conveyed by the conveying unit, a control unit controlling at least the conveying unit and the image capturing unit, a state detector detecting whether the image capturing unit is ready to read the medium, a reset unit resetting the control unit, and one or more operation unit(s) provided on an outer peripheral surface of the housing to give an instruction to the control unit. The reset unit resets the control unit upon satisfaction of a first condition that the state detector detects that the image capturing unit is unready to read the medium and a second condition that the one or more operation unit(s) is operated.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a block diagram of the image-reading apparatus according to the embodiment; and FIG. 6 is a flowchart illustrating the reset operation of the image-reading apparatus according to the embodiment.

DETAILED DESCRIPTION OF THE PREFERRED EMBODIMENTS

The present invention will now be described in detail with reference to the drawings. The embodiment below is not intended to limit the present invention. The components of the embodiment include what is easily conceived by a skilled person or what is substantially identical.

Embodiment

Figure 1:
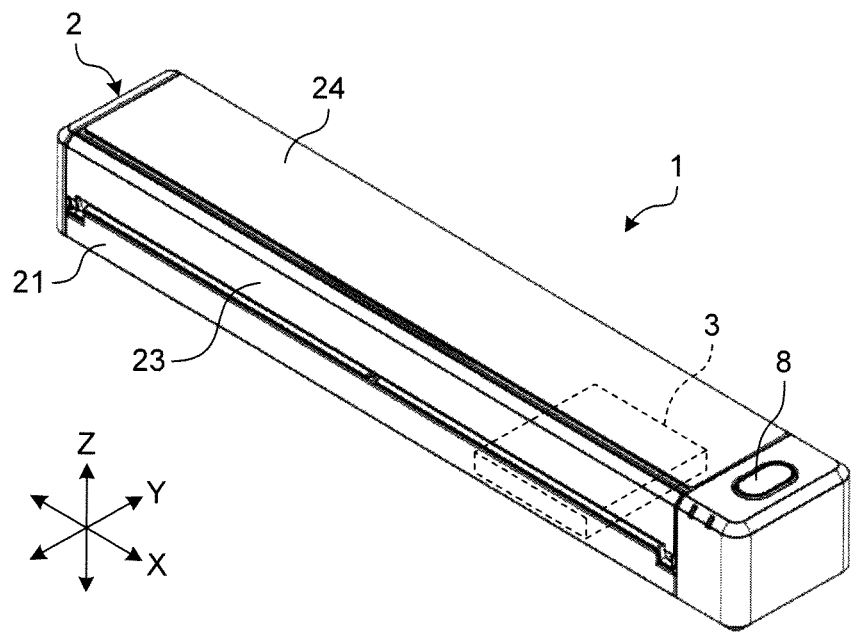
FIG. 1 is a front perspective view illustrating an image-reading apparatus according to an embodiment of the present invention.
Figure 2:
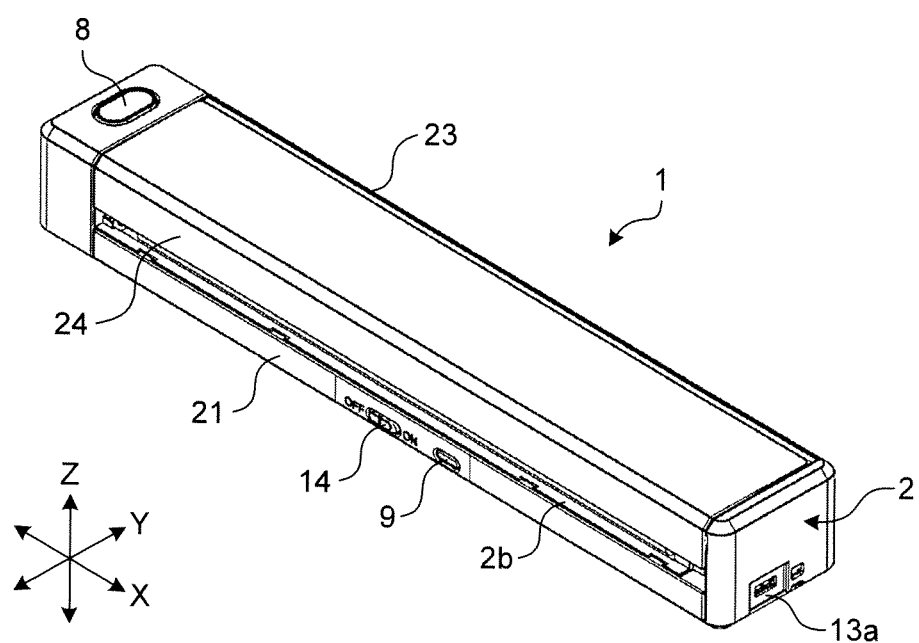
FIG. 2 is a back perspective view illustrating the image-reading apparatus according to the embodiment.
Figure 3:
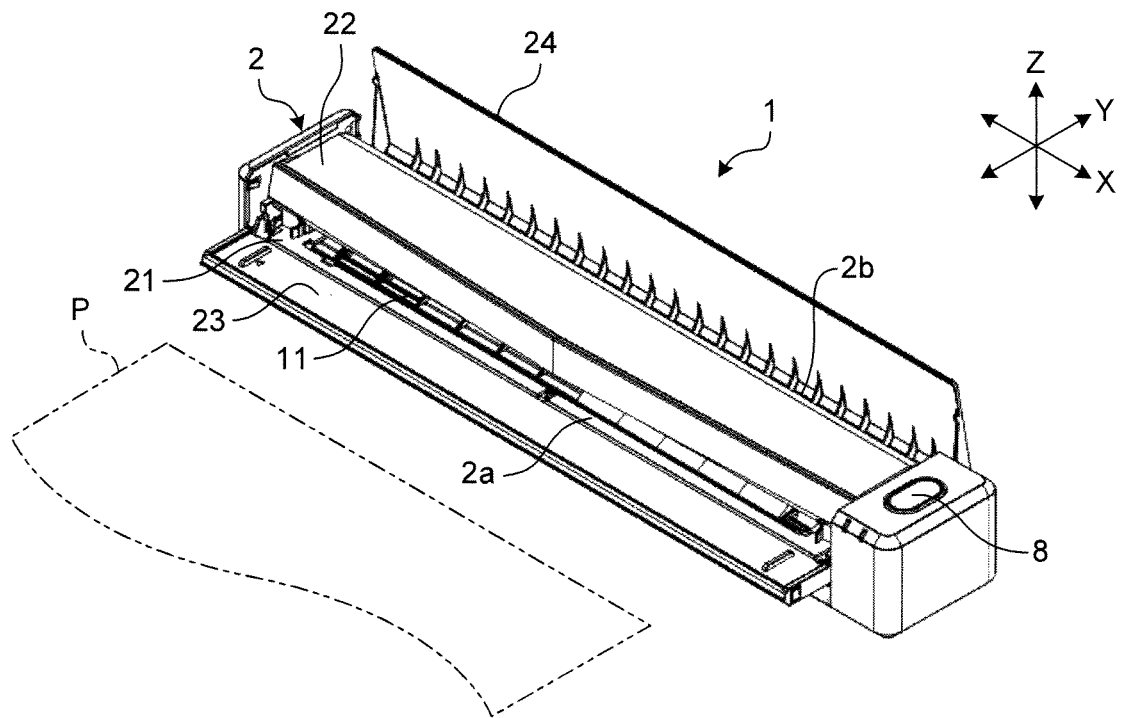
FIG. 3 is a perspective view illustrating the image-reading apparatus according to the embodiment in a state of being used.
Figure 4:
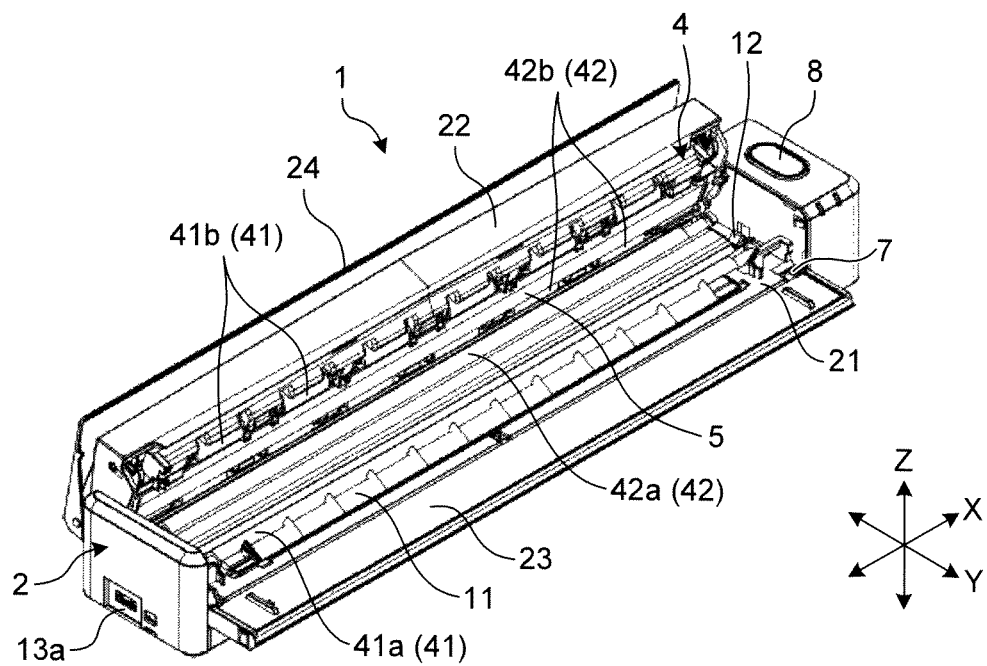
FIG. 4 is a perspective view illustrating the image-reading apparatus according to the embodiment with its upper cover opened.

FIG. 1 is a front perspective view illustrating an image-reading apparatus according to an embodiment. FIG. 2 is a back perspective view illustrating the image-reading apparatus according to the embodiment. FIG. 3 is a perspective view of the image-reading apparatus according to the embodiment in a state of being used. FIG. 4 is a perspective view of the image-reading apparatus with its upper cover open. FIG. 5 is a block diagram of the image-reading apparatus. In FIGS. 1 to 4, the width direction of an image-reading apparatus 1 is defined as an X direction, the depth direction orthogonal to the width direction on the horizontal plane is defined as a Y direction, and the vertical direction orthogonal to the width and the depth directions is defined as a Z direction. FIG. 5 is a functional block diagram where functions of the image-reading apparatus according to the embodiment are illustrated in blocks.

As illustrated in FIG. 1, the image-reading apparatus 1 according to the embodiment is a portable manually-fed image-reading apparatus. As illustrated in FIGS. 3 to 5, a user inserts a medium P into a housing 2 through an insertion slot 2a. The inserted medium P is conveyed to an image capturing unit 5 by a conveying unit 4 and read by the image capturing unit 5. A control unit 6 generates image data corresponding to the medium P and outputs the image data outside. The medium P is not limited to paper, and any medium conveyable by the conveying unit 4, such as an IC card or a magnetic card, is applicable.

As illustrated in FIG. 5, the image-reading apparatus 1 according to the embodiment includes the housing 2, a battery 3, the conveying unit 4, the image capturing unit 5, the control unit 6, a setting-table-opened/closed sensor 7 as a state detector, a scanning button 8 and a Wi-Fi protected setup (WPS) button 9 each as an operation unit, and a reset unit 10. The image-reading apparatus 1 according to the embodiment further includes a medium detecting sensor 11, an upper-cover-opened/closed sensor 12, an interface 13, and a Wi-Fi changeover switch 14.

The housing 2 has the insertion slot 2a for inserting therein the medium P as FIG. 3 illustrated ins and an ejection slot 2b for ejecting the medium P outside, of which an image has been captured by the image capturing unit 5, as FIG. 2 illustrated ins. The housing 2 is formed in the shape of a quadrangular prism extending in the width direction and includes a body 21, an upper cover 22, a setting table 23, and a guiding cover 24. As illustrated in FIGS. 1 and 2, the scanning button 8, the WPS button 9, a connector 13a, which is described later, of the interface 13, the Wi-Fi changeover switch 14, and others are disposed on the outer peripheral surfaces of the housing 2.

The body 21 is a base of the image-reading apparatus 1 and accommodates therein the battery 3, a part of the conveying unit 4, the control unit 6, the setting-table-opened/closed sensor 7, the reset unit 10, the medium detecting sensor 11, the upper-cover-opened/closed sensor 12, the interface 13, and others.

As illustrated in FIG. 4, the upper cover 22 accommodates therein a part of the conveying unit 4, the image capturing unit 5, and others. The upper cover 22 is supported openably or closably in relation to the body 21 about rotational supports (not illustrated) formed at both ends in the width direction thereof. As illustrated in FIG. 3, the upper cover 22 faces the body 21 in a closed state thereof. The insertion slot 2a, the ejection slot 2b, and a convey path for the medium P are formed between the body 21 and the upper cover 22 in the closed state. As illustrated in FIG. 4, the conveying unit 4, the image capturing unit 5, and others are exposed when the upper cover 22 is in an opened state. This means that the convey path is not formed between the body 21 and the upper cover 22 when the upper cover 22 is the opened state, and thus the conveying unit 4 cannot convey the medium P. In this state, the image capturing unit 5 cannot read the medium P. The depth direction is a direction from front to back or vice versa. Each of the rotational supports is formed in the back in the depth direction in the closed state of the upper cover 22.

The setting table 23 is an opening-or-closing unit to open or close the insertion slot 2a. The setting table 23 is supported openably or closably in relation to the body 21 about rotational supports (not illustrated) formed at both ends in the width direction thereof. As illustrated in FIG. 3, the setting table 23 exposes the insertion slot 2a to outside in an opened state thereof, so that the insertion slot 2a is opened. As illustrated in FIG. 1, the setting table 23 is arranged parallel to the vertical direction in a closed state, in which the setting table 23 covers the insertion slot 2a and thus closes the insertion slot 2a. In other words, the medium P is not inserted into the housing 2 (in the convey path) with the setting table 23 closed and thus is not conveyed by the conveying unit 4. In this state, the image capturing unit 5 cannot read the medium P. The vertical direction is a direction from lower side to upper side or vice versa. Each of the rotational supports is formed in the lower side in the vertical direction in the closed state of the setting table 23.

The guiding cover 24 switches an ejecting direction of the medium P ejected from the ejection slot 2b. The guiding cover 24 is supported openably or closably in relation to the body 21 about rotational supports (not illustrated) formed at both ends in the width direction thereof. As illustrated in FIG. 2, the guiding cover 24 forms the ejection slot 2b in the depth direction in a closed state thereof and ejects the medium P backward in the depth direction, that is, the guiding cover 24 ejects the medium P linearly. As illustrated in FIG. 3, the guiding cover 24 forms the ejection slot 2b in the vertical direction in an opened state thereof and ejects the medium P upward in the vertical direction, that is, the guiding cover 24 ejects the medium P in a curving manner. Each of the rotational supports is formed in the back in the depth direction and on the lower side in the vertical direction in the closed state of the guiding cover 24.

The battery 3 is a secondary battery which is built-in in the housing 2 as illustrated in FIG. 1. Specifically, the battery 3 in the embodiment is built-in in the body 21 and connected to the control unit 6 as illustrated in FIG. 5. The battery 3 supplies electricity through the control unit 6 to each component of the image-reading apparatus 1 such as the conveying unit 4 and the image capturing unit 5. The control unit 6 controls charge and discharge of the battery 3. The control unit 6 controls the battery 3 in a charge mode while an external device 100 is supplying electricity to the image-reading apparatus 1, whereas the control unit 6 controls the battery 3 in a discharge mode, that is, in a condition to operate the image-reading apparatus 1 with electricity supplied from the battery 3 while the external device 100 is supplying no electricity to the image-reading apparatus 1.

The conveying unit 4 conveys the medium P to the inside of the housing 2 through the insertion slot 2a and ejects the medium P whose image has been captured by the image capturing unit 5 to the outside of the image-reading apparatus 1 through the ejection slot 2b. As illustrated in FIG. 4, the conveying unit 4 in the embodiment includes a pair of first conveying rollers 41, a pair of second conveying rollers 42, a motor (not illustrated), and a motor driving circuit (not illustrated). The pair of first conveying rollers 41 includes a driving roller 41a extending in the width direction and a plurality of driven rollers 41b disposed in the width direction and pressed by the driving roller 41a with predetermined pressure in a state where the upper cover 22 is closed. The driving roller 41a is connected to the motor. The pair of second conveying rollers 42 includes a driving roller 42a extending in the width direction and a plurality of driven rollers 42b disposed in the width direction and pressed by the driving roller 42a with predetermined pressure in a state where the upper cover 22 is closed. The driving roller 42a is connected to the motor. The conveying unit 4 is connected to the control unit 6. When the motor rotates driven by the motor driving circuit controlled by the control unit 6, the driving rollers 41a and 42a start rotating and the conveying unit 4 operates. The medium P, which is inserted into the pair of first conveying rollers 41 by a user through the insertion slot 2a, is conveyed in a convey direction by the rotation of the driving roller 41a, inserted into the pair of second conveying rollers 42, and ejected outside the housing 2 through the ejection slot 2b. The image capturing unit 5 repeatedly scans in the main scanning direction while the medium P is moved relatively to the image capturing unit 5 in the convey direction by the conveying unit 4. This enables a scan of the medium P in the sub-scanning direction. In this way, the image capturing unit 5 reads the medium P. The control unit 6 controls conveyance of the medium P by the conveying unit 4, for example, controls the timing and speed to convey the medium P. In the embodiment, the driving rollers 41*a* and 42*a* are disposed in the body 21 of the housing 2, and the driven rollers 41*b* and 42*b* are disposed in the upper cover 22. However, this layout is not limiting. The driven rollers 41*b* and 42*b* may be disposed in the body 21, whereas the driving rollers 41*a* and 42*a* may be disposed in the upper cover 22.

The image capturing unit 5 captures an image of the medium P conveyed by the conveying unit 4. The image capturing unit 5 scans the medium P in the main scanning direction (the width direction). The image capturing unit 5 is disposed between the pair of first conveying rollers 41 and the pair of second conveying rollers 42 of the conveying unit 4. The image capturing unit 5 in the embodiment includes a light source (not illustrated) irradiating light to the medium P, a plurality of image capturing elements (not illustrated) aligned linearly in the main scanning direction, a lens (not illustrated) guiding light reflected on the medium P to be incident on the image capturing elements. As illustrated in FIG. 5, the image capturing unit 5 is connected to the control unit 6 and outputs an output signal of each image capturing element to the control unit 6, the output signal being based on an output value corresponding to the light (light emitted from the light source and reflected on the medium P) being incident on each the image capturing element through the lens. The control unit 6 controls image capturing of the image capturing unit 5, for example, controls lighting of the light source, the exposure timing of each image capturing element, and the exposure time.

The control unit 6 controls at least the conveying unit 4 and the image capturing unit 5 as illustrated in FIG. 5. The control unit 6 serves also as an image processing unit and generates image data corresponding to the medium P based on the output signal output from the image capturing unit 5. The control unit 6 generates line data corresponding to a scan in the main scanning direction and generates image data consisting of a plurality of pieces of line data. The control unit 6 further controls correction and cropping of the generated image data and controls an output of the image data to the external device 100 connected with the image-reading apparatus 1 through the interface 13 connected to the control unit 6. The control unit 6 includes a memory unit (not illustrated) that can store therein the generated image data. The control unit 6 in the embodiment is reset in response to a reset signal from the reset unit 10. A reset of the control unit 6 means a forcible restart. By resetting the control unit 6, supply of electricity from the battery 3 is forcibly cut. The hardware of the control unit 6 is configured with known components such as various memories including a random access memory (RAM) and a read only memory (ROM) and a central processing unit (CPU).

The setting-table-opened/closed sensor 7 detects opened or closed state of the setting table 23. The setting-table-opened/closed sensor 7 in the embodiment is a state detector and specifically detects whether the image capturing unit 5 is ready to read the medium P, which means whether the insertion slot 2*a* is opened by the setting table 23. The setting-table-opened/closed sensor 7 is connected to the control unit 6 and the reset unit 10, and a setting-table-opened/closed signal based on the opened or closed state of the setting table 23 is output to the control unit 6 and the reset unit 10. As illustrated in FIG. 4, the setting-table-opened/closed sensor 7 is a mechanical sensor provided to the body 21 and turned on by the pressure of the setting table 23 when the setting table 23 is closed. The setting-table-opened/closed sensor 7 detects on or off state of the image-reading apparatus 1. Specifically, the setting-table-opened/closed sensor 7 detects that the image-reading apparatus 1 is in the off state when the setting table 23 is closed and detects that the image-reading apparatus 1 is in the on state when the setting table 23 is opened. Accordingly, a setting-table-opened/closed signal, i.e., a setting-table-opened signal or setting-table-closed signal, based on the opened or closed state of the setting table 23 is input to the control unit 6 as an on/off signal of the apparatus. When the setting-table-opened/closed sensor 7 detects, based on the on/off signal of the apparatus, that the setting table 23 has changed from the closed state to the opened state, the control unit 6 turns on the image-reading apparatus 1 and switches the image-reading apparatus 1 from a halt state to a state where the image-reading apparatus is ready to read the medium P, that is, a standby state. When the setting-table-opened/closed sensor 7 detects, based on the on/off signal of the apparatus, that the setting table 23 has changed from the opened state to the closed state, the control unit 6 turns off the image-reading apparatus 1 and switches the image-reading apparatus 1 from the standby state to a state where the image-reading apparatus is not ready to read the medium P, or, the image-reading apparatus is unready to read the medium P, that is, the halt state.

The scanning button 8 is an operation unit used for giving instructions to the control unit 6 and specifically instructing the image-reading apparatus 1 to start reading the medium P. The scanning button 8 in the embodiment is one of specific operation units and, as illustrated in FIG. 1, provided on a surface on the upper side in the vertical direction, that is, on the top surface of the outer peripheral surfaces of the housing 2 and provided on one of both ends in the width direction. The scanning button 8 is connected to the control unit 6 and the reset unit 10 as illustrated in FIG. 5, and a scanning-button-on signal is output to the control unit 6 and the reset unit 10. The type of the scanning button 8 is not limited as long as it can output the scanning-button-on signal upon an operation made by a user. Examples of the scanning button 8 may include a mechanical push button, a capacitance touch button, and an optical touch button.

The Wi-Fi protected setup (WPS) button 9 is an operation unit used for giving instructions to the control unit 6 and specifically instructing the start of automatic initialization to establish connection between the image-reading apparatus 1 and the external device 100 with Wi-Fi (trade mark of Wi-Fi Alliance), or wireless fidelity, which is a standard of wireless communications. The WPS button 9 in the embodiment is a specific operation unit and, as illustrated ins FIG. 2, disposed on a surface in the back in the depth direction, that is, on the back surface of the outer peripheral surfaces of the housing 2, on the lower side in the vertical direction, and at the center in the width direction. As illustrated in FIG. 5, the WPS button 9 is connected to the control unit 6 and the reset unit 10, and a WPS-button-on signal is output to the control unit 6 and the reset unit 10. The type of the WPS button 9 is not limited as long as it can output the WPS-button-on signal upon an operation made by a user. Examples of the WPS button 9 may include a mechanical push button, a capacitance touch button, and an optical touch button.

The reset unit 10 resets the control unit 6. The reset unit 10 is connected to the control unit 6 and outputs a reset signal to the control unit 6 when a first condition that the state detector determines that the image capturing unit 5 is unready to read the medium P is satisfied and a second condition that an operation unit has been operated is satisfied. In the embodiment, the first condition is that the setting-table-opened/closed sensor 7 detects that the insertion slot 2a is closed, in other words, that the setting table 23 is closed. The second condition, in the embodiment, is that the scanning button 8 and the WPS button 9 as two specific operation units are simultaneously operated. The reset unit 10 in the embodiment resets the control unit 6 when the setting-table-closed signal, the scanning-button-on signal, and the WPS-button-on signal are input. The hardware of the reset unit 10 is configured with an electronic circuit.

The medium detecting sensor 11 detects an insertion state of the medium P into the insertion slot 2a. As illustrated in FIG. 3, the medium detecting sensor 11 is disposed at a position near the insertion slot 2a in the housing 2. The medium detecting sensor 11 is rotatably supported between a blocking position blocking the convey path and a releasing position releasing the convey path in the housing 2 about the rotational supports (not illustrated) formed at both ends in the width direction. An urging member (not illustrated) urges the medium detecting sensor 11 so that the medium detecting sensor 11 is situated at the blocking position in a state where no external force is applied to the medium detecting sensor 11. When the medium P is inserted into the insertion slot 2a, the medium detecting sensor 11 moves from the blocking position to the releasing position against the urging force. With this, the medium P is set in the image-reading apparatus 1. As illustrated in FIG. 5, the medium detecting sensor 11 is connected to the control unit 6. When a detecting unit (not illustrated), included in the medium detecting sensor 11, detects that the medium detecting sensor 11 is situated at the releasing position, the detecting unit outputs a medium-set signal to the control unit 6.

The upper-cover-opened/closed sensor 12 detects opened or closed state of the upper cover 22. The upper-cover-opened/closed sensor 12 is connected to the control unit 6 and outputs an upper-cover-opened/closed signal, i.e., an upper-cover-opened signal or upper-cover-closed signal, based on the opened or closed state of the upper cover 22. The upper-cover-opened/closed sensor 12 is a mechanical sensor provided to the body 21 as illustrated in FIG. 4 and turned on by the pressure of the upper cover 22 when the upper cover 22 is closed.

As illustrated in FIG. 5, the interface 13 connects the image-reading apparatus 1 and the external device 100. In the embodiment, the interface 13 includes a connector 13a which connects the image-reading apparatus 1 with the external device 100 with wired connections such as a universal serial bus (USB), and a communication unit 13b which connects the image-reading apparatus 1 with the external device 100 through wireless communications using Wi-Fi. The interface 13 is connected to the control unit 6. The interface 13, for example, outputs image data generated by the control unit 6 to the connected external device 100 and receives inputs such as setting data of the image-reading apparatus 1 and operation instructions from the external device 100. The interface 13 outputs an initialization signal including information of an ID and a cipher key to the external device 100 in response to an input of the WPS-button-on signal to the control unit 6. The interface 13 connects or disconnects wireless communications with the external device 100 in response to a wireless-communication on/off signal, which is described later, input to the control unit 6.

The Wi-Fi changeover switch 14 is an operation unit to give instructions to the control unit 6 and specifically to instruct connection and disconnection of wireless communications between the image-reading apparatus 1 and the external device 100. As illustrated in FIG. 2, in the embodiment, the Wi-Fi changeover switch 14 is disposed on a surface in the back in the depth direction, that is, on the back surface of the outer peripheral surfaces of the housing 2, on the lower side in the vertical direction, and at the center in the width direction. As illustrated in FIG. 5, the Wi-Fi changeover switch 14 is connected to the control unit 6 and outputs the wireless-communication on/off signal. The Wi-Fi changeover switch 14 in the embodiment is a slide switch; however, the type of the switch is not limited as long as it can output the wireless-communication on/off signal upon an operation made by a user. Examples of the Wi-Fi changeover switch 14 may include a mechanical push button, a capacitance touch button, and an optical touch button.

The reading operation to read the medium P performed by the image-reading apparatus 1 will now be described. The description is made on the premise that the image-reading apparatus 1 has been turned on with the setting table 23 opened and thus is in a standby state.

When the medium detecting sensor 11 detects that the medium P is inserted into the insertion slot 2a, the control unit 6 performs pre-pulling-in. The pre-pulling-in means that, by operating the conveying unit 4 for a short time (for example, for a few seconds), the leading end of the medium P (the end part of the medium P in the convey direction) contacting with the pair of first conveying rollers 41 is inserted between the driving roller 41a and the driven rollers 41b, whereby the medium P is held by the conveying unit 4.

The control unit 6 performs reading of the medium P when the image-reading apparatus 1 is instructed to start reading the medium P by the scanning button 8. In reading the medium P, the control unit 6 controls, for example, lighting by a light source, image capturing by a plurality of image capturing elements, and conveyance by the conveying unit 4. Specifically, the control unit 6 performs reading processing in which the controller 6 makes the conveying unit 4 convey the medium P to the image capturing unit 5, and until at least the trailing end of the medium P being read is conveyed to the image capturing unit 5 by the conveying unit 4, reads the medium P by capturing an image of the medium P by the image capturing unit 5 based on light reflected on the medium P after emitted from the light source. After that, the control unit 6 generates image data corresponding to the medium P and outputs the image data to the external device 100 through the interface 13.

The reset operation of the image-reading apparatus 1 is now described. FIG. 6 is a flowchart of the reset operation of the image-reading apparatus according to the embodiment. The reset operation is performed under an abnormal condition of the image-reading apparatus 1 such as a case where the control unit 6 hangs up or freezes. The abnormal condition of the image-reading apparatus 1 occurs in either circumstance where the external device 100 supplies electricity to the control unit 6 or the battery 3 supplies electricity to the control unit 6.

The reset unit 10 determines whether the following three factors are satisfied: as the first condition, the setting table 23 is closed, and as the second condition, the scanning button 8 is operated and the WPS button 9 is also operated (Step ST1). In this process, unless all of the three factors are satisfied, the reset unit 10 does not determine that the user has given a reset instruction. Thus, the reset unit 10 determines whether the user has given a reset instruction of the control unit 6.

When the reset unit 10 determines that the three factors are satisfied (Step ST1), the reset unit 10 outputs a reset signal to the control unit 6 (Step ST2).

The control unit 6 performs a reset in response to the input reset signal (Step ST3). With the reset, electricity supply from the battery 3 to the control unit 6 is forcibly cut. After the reset, the control unit 6 is in either a halt state or a standby state depending on the opened or closed state of the setting table 23.

In the image-reading apparatus 1 in the embodiment, when the control unit 6 hangs up or freezes, particularly under an abnormal condition of the image-reading apparatus 1 which is supplied with electricity from the battery 3, the control unit 6 is reset upon satisfaction of the first condition determining that the image capturing unit 5 is unready to read the medium P and the second condition where a user operates an operation unit voluntarily unlike the first condition. In other words, the control unit 6 is reset only when the image-reading apparatus 1 is not being used as an image-reading apparatus and the user intends to make a reset. This enables a reliable reset of the control unit 6. Furthermore, because the control unit 6 is reset when the image-reading apparatus 1 is not being used as an image-reading apparatus, troubles such as damage on the medium P being conveyed are avoided and safety of the image-reading apparatus 1 is thus secured. In addition, the control unit 6 is reset under an abnormal condition of the image-reading apparatus 1 receiving electricity from the battery 3, and this reduces electricity consumption of the battery 3.

Since the first condition is that the setting table 23 is in a closed state, the conditions to reset the control unit 6 include not only a case where the medium P is physically unable to be read because the insertion slot 2a is closed and thus the medium P cannot be inserted into the insertion slot 2a but also a case where the medium P is functionally unable to be read because the image-reading apparatus 1 is turned off. In other words, when the image-reading apparatus 1 according to the embodiment is used for its intended purpose, the image-reading apparatus 1 needs to be turned on with the setting table 23 opened. This means that no requirements of a reset are made by a user during use of the image-reading apparatus 1 for its intended purpose, and thus the control unit 6 is not reset in this case.

It is preferable that the scanning button 8 and the WPS button 9 in the embodiment be disposed on the outer peripheral surfaces of the housing 2 at respective positions which are beyond reach of a single hand of an user. For example, even if an average user stretches the fingers of a hand as much as possible, and one of the tips of the farthest fingers from each other such as the thumb and the second finger is placed on either the scanning button 8 or the WPS button 9, the other one of the scanning button 8 and the WPS button 9 is disposed at a position beyond reach of the other tip, on an outer peripheral surface of the housing 2. Because the user has difficulty in performing an action to satisfy the second condition, which is described later, with the single hand, the user needs to use both hands. This prevents the control unit 6 from being easily reset by using only a single hand, compared to a case where the user has to use both hands to reset the control unit 6.

In the embodiment, the state detector is embodied by the setting-table-opened/closed sensor 7. However, another component is also applicable as long as it can detect whether the image capturing unit 5 is ready to read the medium P. Examples of the state detector may include the upper-cover-opened/closed sensor 12. In this case, the first condition is that the upper-cover-opened/closed sensor 12 determines that the upper cover 22 is in the opened state. The number of state detectors is not limited to one, and a plurality of state detectors may be employed. In this case, the first condition may be, for example, that the setting-table-opened/closed sensor 7 determines that the setting table 23 is in the closed state and that the medium detecting sensor 11 detects no medium P in the insertion slot 2a. As another example, the first condition may be that the setting-table-opened/closed sensor 7 determines that the setting table 23 is in the closed state and that the image capturing unit 5 is not capturing an image of the medium P.

In the embodiment, specific operation units are embodied by the scanning button 8 and the WPS button 9. However, this configuration is not limiting. The Wi-Fi changeover switch 14 may replace either the scanning button 8 or the WPS button 9. When any other operation units are provided on the outer peripheral surfaces of the housing 2, those operation units may serve as specific operation units.

The image-reading apparatus according to the present invention has an advantage of allowing a user to reset the control unit in a more reliable manner on the user's own intention in a condition where the image-reading apparatus is not in use, when an abnormal condition occurs on the image-reading apparatus which is supplied with electricity from a secondary battery.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-reading apparatus comprising:
 a housing having an insertion slot for inserting therein a medium;
 a battery being built-in in the housing;
 a conveying unit conveying the medium from the insertion slot to inside of the housing;
 an image capturing unit capturing an image of the medium conveyed by the conveying unit;
 a control unit controlling at least the conveying unit and the image capturing unit;
 a state detector detecting whether the image capturing unit is ready to read the medium;
 a reset unit resetting the control unit; and
 two or more operation units provided on an outer peripheral surface of the housing to give an instruction to the control unit, wherein
 the reset unit resets the control unit upon simultaneous satisfaction of a first condition that the state detector detects that the image capturing unit is unready to read the medium and a second condition that two specific operation units among the operation units are simultaneously operated.

2. The image-reading apparatus according to claim 1, further comprising:
 an opening-or-closing unit opening or closing the insertion slot, wherein
 the state detector detects whether the insertion slot is opened by the opening-or-closing unit, and
 the first condition is that the state detector detects the insertion slot is closed.

3. The image-reading apparatus according to claim 1, wherein the two specific operation units are disposed at respective positions that are distant beyond reach of a single hand of a user from each other on an outer peripheral surface of the housing.

* * * * *